Feb. 11, 1947. S. L. MONSON 2,415,516
TAP AND DRILL GAUGE
Filed July 5, 1945

INVENTOR.
SAMUEL L. MONSON
BY Gardner & Warren
his attys.

Patented Feb. 11, 1947

2,415,516

UNITED STATES PATENT OFFICE 2,415,516

TAP AND DRILL GAUGE

Samuel L. Monson, Berkeley, Calif.

Application July 5, 1945, Serial No. 603,317

2 Claims. (Cl. 88—2.2)

1

The invention relates to a gauge or tool for indicating the angular position of a boring or tapping bit when advanced into the work.

An object of the invention is to provide a gauge of the character described which will serve by reflection of the bit on a surface of the gauge to afford a positive indication of the deflection of the bit from a predetermined position.

Another object of the invention is to provide a gauge of the character described which will be of a form and design permitting the gauge to be utilized both with straight and curved or irregularly sided bits.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

As is well known, in drilling or tapping a hole in a piece of work, particularly when the drilling or tapping tool is supported and operated by the hand of the mechanic, the drill or tap may become deflected out of position especially during the initial operations. Sometimes a square is used to check any deflection, the square being positioned with one edge against the side of the bit and the edge at right angles thereto placed against the surface of the work through which the hole extends. While this manner of checking is fairly satisfactory when applied to a drill bit, which usually has straight sides, it is not so satisfactory when utilized in connection with the tap, the reason being that in the latter case the sides of the tap are usually tapered either in part or for the full length of the flutes. With the tool of my invention an accurate checking for deflection can be made practically regardless of the shape of the tap, the checking being accomplished by providing for cooperative engagement with the tap a tool having exposed reflective surfaces arranged for positioning at substantially opposite or different side portions of the tap in such manner that any deflection of the tap will cause the tap to be reflected on one of such surfaces in the direction of the deflection. Desirably the reflecting surfaces of the tool are incorporated in a body in the form of a mechanics square, thereby permitting the tool to be used for checking the deflection of a drill or tap with either of the methods described.

Figure 1:
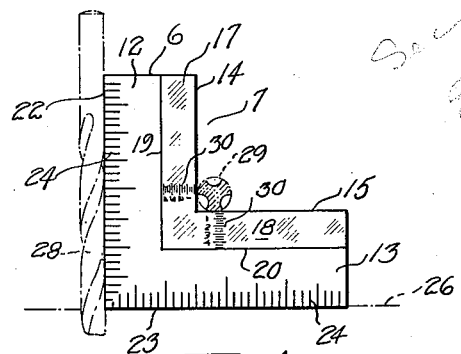
Figure 1 is a plan view of the gauge of my invention and indicating its position when used with drill and tap bits.
Figure 2:
Figure 2 is an end view of the gauge showing it as used with a tap bit.

The gauge of my invention as illustrated in Figures 1 and 2, comprises a body 6 having a recess 7 defined by angular related inner edges 8 and 9 of portions 12 and 13 of the body. Edges 8 and 9 are preferably disposed at an angle of 90° with respect to each other, and are designed to provide engaging surfaces for contact with the sides of a tap bit or the like when the gauge is utilized for checking the angle of the bit with respect to the work in which the bit is being advanced.

Extending along the portions 12 and 13 and having edges 14 and 15 flush with the edges 8 and 9, is an inlay 17 whose outer surface 18 is preferably flush with the corresponding surface of the body and is polished or otherwise formed to afford a high degree of reflection. Desirably the inlay 17 is made of metal which will provide a hard as well as a highly reflective surface when polished. The inlay may extend over the entire body but it is preferable to terminate the inner edges 19 and 20 thereof inwardly of the outer edges 22 and 23 of the body in order to permit measurement graduations such as indicated at 24 to be provided in the body material along said latter edges.

In the use of the tool, checking of the drill position is usually done as diagrammatically illustrated in Figure 1, by placing one of the edges 19 and 20 upon the surface 26 of the work 27 and positioning the other of such edges against the side of the drill 28. After the drilling operation has been completed, and the tap 29 is inserted in the bore, the tool is layed flat upon the surface 26 of the work with the reflecting surface 18 exposed and the edges 22 and 23 placed in contact with the sides of the tap as shown in Figure 2 and also diagrammatically illustrated in Figure 1. Then with the eye of the operator practically directly over the tool as indicated in Figure 2, the tool is swung around the tap while resting on the surface 26 and with both edges 22 and 23 in engagement with the sides of the tap.

As will be evident if no portion of the tap is reflected on the surface 18 or if an equal area thereof is reflected in all positions of the tool, the tap will be positioned to extend straight into the material or in other words normal to the work surface 26. On the other hand if in any of the positions of the tool a portion of the tap is seen reflected on the tool surface 18 or at least a greater portion is reflected in one position than in another, then the operator will be apprised of the deflection of the tap and the location of the point at which the deflection is greatest. In this latter connection, as will be noted from Figure 1, graduations 30 are provided on the surface 18 on each of the inlay portions so as to enable the mechanic to readily measure and compare the amount of deflection in the various positions of the tool.

Figure 3:
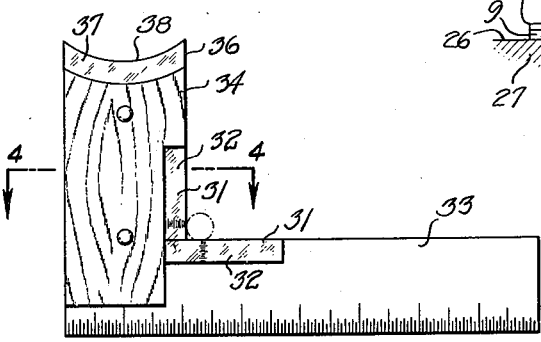
Figure 3 is a plan view of the gauge in a somewhat modified form.
Figure 4:
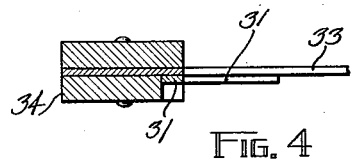
Figure 4 is a sectional view of the gauge taken on the line 4—4 of Figure 3.

In Figure 3, the tool is designed as a part of what is generally known as a hand square. As here shown inlays 31, with exposed reflecting surfaces 32, are secured on the blade and handle portions 33 and 34 of the square at the adjoining parts thereof. In addition to the inlays 31, an inlay 36 with an outer reflecting surface 37 is provided at the free end of the handle portion 34. Preferably the inlay 36 is formed arcuately concave so that the outer edge 38 may partially fit about the tap.

Figure 5:
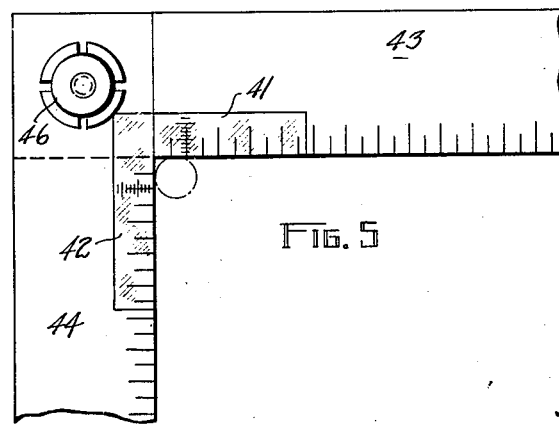
Figure 5 is a plan view of a still further modified form of the gauge.

In Figure 5, inlays 41 and 42 are provided on separate body sections or blades 43 and 44 which are pivotally connected together at their inner ends. With the blades adjustable in this manner, larger diameter taps may be brought closer to the apex and thus reduce the blank area between the tap and the inner end portions of the inlays. A clamping screw 46 may be provided as a pivot for the blades and for holding the blades in angularly adjusted position.

I claim:
1. An instrument for indicating a degree of angularity, with the work surface of an object of a tool such as a tap angularly extending from said surface and along a longitudinal side of which a line of sight may be directed, comprising a member having angular related legs connected together and defining at their juncture a recess for receiving said tool with an edge of each leg in engagement with the sides of said tool, said legs having on a side thereof a planar sighting surface and on another side thereof a work engaging surface formed to position said sighting surface in parallel relation to said surface of the work when the member is operatively positioned thereon, and said sighting surfaces being reflective to a degree so as to project an image of any portion of said tool overlying the sighting surface upwardly to an observer's eye registered with said line of sight.

2. An instrument in accordance with claim 1 characterized by graduations on said sighting surfaces for indicating the degree of angularity of the tool with the work surface.

SAMUEL L. MONSON.

REFERENCES CITED

The following references are of record in the file of this patent:

UNITED STATES PATENTS

| Number | Name | Date |
| --- | --- | --- |
| 856,497 | Southam et al. | June 11, 1907 |
| 1,089,885 | Wallace | Mar. 10, 1914 |
| 781,117 | Willits | Jan. 31, 1905 |
| 735,899 | Paul | Aug. 11, 1903 |